US010755308B2

(12) United States Patent
Wilkens et al.

(10) Patent No.: US 10,755,308 B2
(45) Date of Patent: Aug. 25, 2020

(54) LOCAL-SEARCH OPTIMIZATION AND PRICING FOR RICH AD ALLOCATION

(71) Applicant: Yahoo Holdings, Inc., Sunnyvale, CA (US)

(72) Inventors: Chris Wilkens, Sunnyvale, CA (US); Prabhakar Krishnamurthy, Pleasanton, CA (US); Maxim Sviridenko, New York, NY (US); Ruggiero Cavallo, New York, NY (US); Darja Krushevskaja, Mountain View, CA (US)

(73) Assignee: Oath Inc., New York, NY (US)

( * ) Notice: Subject to any disclaimer, the term of this patent is extended or adjusted under 35 U.S.C. 154(b) by 471 days.

(21) Appl. No.: 15/360,714

(22) Filed: Nov. 23, 2016

(65) Prior Publication Data

US 2018/0114248 A1    Apr. 26, 2018

Related U.S. Application Data

(60) Provisional application No. 62/412,163, filed on Oct. 24, 2016.

(51) Int. Cl.
*G06Q 30/02* (2012.01)
*G06F 16/951* (2019.01)

(52) U.S. Cl.
CPC ..... *G06Q 30/0256* (2013.01); *G06Q 30/0275* (2013.01); *G06Q 30/0277* (2013.01); *G06F 16/951* (2019.01)

(58) Field of Classification Search
None
See application file for complete search history.

(56) References Cited

U.S. PATENT DOCUMENTS

| 2006/0106709 | A1* | 5/2006 | Chickering | G06Q 30/02 705/37 |
| 2014/0306989 | A1* | 10/2014 | Doubleday | G06T 11/60 345/629 |
| 2015/0178786 | A1* | 6/2015 | Claessens | G06F 16/901 705/14.66 |
| 2015/0199708 | A1* | 7/2015 | Ying | G06Q 30/0241 705/14.4 |

OTHER PUBLICATIONS

Aggarwal, Gagan et al.; "General Auction Mechanism for Search Advertising", arXiv:0807.1297v1 [cs.GT] Jul. 8, 2008; Jul. 3, 2008; pp. 1-20.
Bachrach, Yoram et al.; "Optimising Trade-offs Among Stakeholders in Ad Auctions", arXiv:1404.5127v1 [cs.GT] Apr. 21, 2014; 23 pages.

* cited by examiner

*Primary Examiner* — Alexandru Cirnu
(74) *Attorney, Agent, or Firm* — Cooper Legal Group, LLC

(57) ABSTRACT

Systems, devices, and methods generate a more accurate search advertising auction that considers heterogeneous attributes of advertisements for inclusions into an available advertisement space. Each advertisement considered for inclusion into the available advertisement space may be further analyzed to generate a truthful estimated price for reference during an online bidding for the advertisement space.

20 Claims, 6 Drawing Sheets

LOCAL-SEARCH OPTIMIZATION AND PRICING FOR RICH AD ALLOCATION

CROSS-REFERENCE TO RELATED APPLICATION

This application claims benefit to U.S. Provisional Patent Application 62/412,163, filed Oct. 24, 2016, the entirety of which is hereby incorporated by reference herein.

BACKGROUND

Within a network system, a web server may host a web page that includes both web page content displayed within a content area of the web page, as well as supplemental content displayed within one or more dedicated non-content areas of the web page. An auction server may be in communication with the web server to run an online auction for selecting supplemental content for insertion into the non-content areas. The auction server may select winners of the online auction based on bids received from supplemental content owners to "win" one or more of the non-content areas.

When each non-content area available on the web page is uniform, or at least substantially uniform, in size and/or the type of content available for insertion into the non-content area, the estimated worth of each non-content area may be relatively easy to calculate for the online auction. Accurately calculating an estimated worth for the non-content areas allows the auction server to provide bid prices that better represent the worth of the non-content areas to the supplemental content owners.

However, newer types of non-uniform supplemental content having previously unavailable attributes not seen before, such as size, proportions, and characteristics, are being developed. The introduction of such newer types of supplemental content may not be effectively handled by previous online auction platforms that were intended to handle uniform supplemental content.

DETAILED DESCRIPTION

Figure 1:
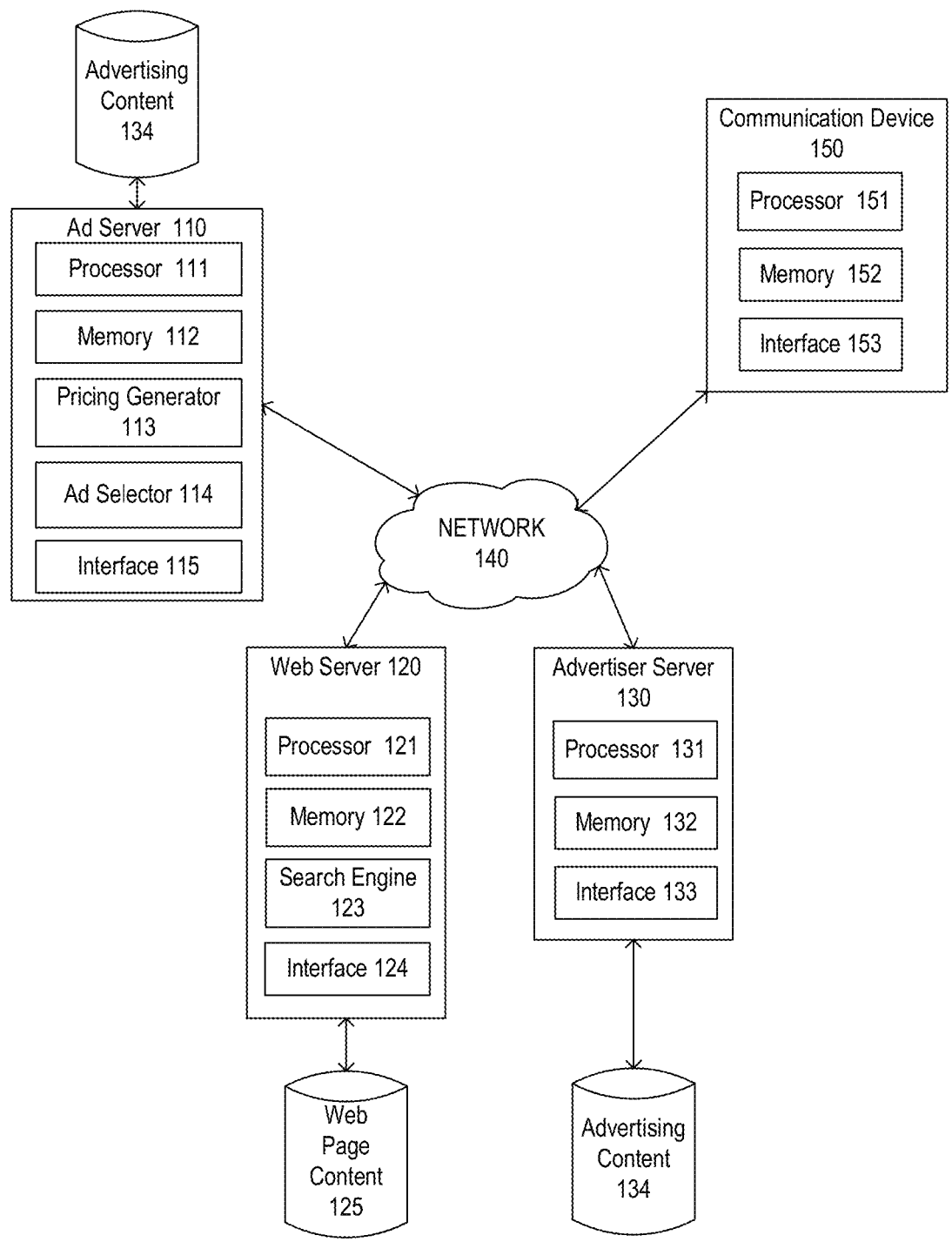
FIG. 1 illustrates a system diagram of an exemplary advertisement network system.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

With the increasing popularity of consumers viewing web-based content for entertainment, research, news, shopping, and other types of information gathering tasks, advertisers and web page publishers have taken notice. Accordingly, new advertisement network systems running within an Internet environment are described that provide new features that take advantage of new internet technology not previously available. In particular, features are described that provide accurate price estimates for non-conforming non-content areas (e.g., advertisement space) in an online auction is provided. By providing accurate price estimates for non-conforming advertisement spaces, publishers are able to present estimated prices that more accurately represent a worth to the advertisers that are bidding for the advertisement spaces.

Within the advertisement network system, an advertiser is understood to generate and otherwise provide an internet advertisement that offers, for example, goods or services for sale. The internet advertisement may then be displayed within a dedicated advertisement space on a web page. The advertiser may control an advertiser server to create the internet advertisements. The advertiser may also control, either alone or in combination with an ad server, submission of bids for purchasing advertisement spaces that are made available on the web page. Bids may be submitted by the advertiser to the publisher of the web page for each unique instance of an advertisement space that is generated on the web page. Subsequently, the advertiser may be referred to as the bidder.

A publisher is understood to host the web page that includes both advertisement space and content areas, where the content areas include original content generated by the publisher for consumption by visitors to the web page. The content areas may include, for example, articles, pictures, videos, as well as a search engine for receiving a user's search query keywords, and search results that are generated in response to the search query keywords. In addition to the search results, the publisher may make available one or more advertisement spaces along with the search results. The publisher, either alone or in combination with the ad server, may calculate an estimated price for each advertisement space that is generated based, at least in part, on the search query keywords received by the search engine, publisher attributes, and/or the bid amounts received from the publishers. The estimated price may be an actual bid price for the advertisement space, or a relative worth compared to other available advertisement spaces. After calculating the estimated price for each advertisement space, the ad server may assign a bid price to each advertisement space based on their calculated estimated price. The ad server may then accept bids from the advertisers and assign winning bids to each of the advertisement spaces so that each advertisement space will include an advertisement from their respective winning advertiser.

The publisher may control a publisher web server that hosts the web page for displaying the content and the advertisement. The publisher may also control the ad server that selects the internet advertisement for display on the web page based on a user's search query input to a search engine on the host web page.

The bid price assigned to an advertisement space may be in terms of a single set price for displaying an advertisement within the advertisement space paid by the advertiser to the publisher.

The bid price for the advertisement space may also be in terms of a cost-per-click (CPC) rate paid by the advertiser to the publisher for each click on an internet advertisement published on the publisher's web page. Clicking on the internet advertisement may navigate a user to the advertiser's web page. According to some embodiments, the ad server may be part of the web server, and according to other embodiments the ad server may be a separate device in communication with the web server.

The use of a generalized second price (GSP) auction is one example of a selling mechanism for sponsored search ads. Under the GSP auction, each search inquiry to a search engine may include one or more keywords. The recognition of one or more keywords may trigger one or more advertisers to place a bid for advertisement space that will become available on a search results web page along with search result content. When more than one advertisement space is available, each of the available advertisement spaces may be assigned a bid price based on an estimated price or other representation of worth based on their attributes. For example, advertisement spaces that are positioned closer to the top of a web page may be assigned a bid price that is greater than bid prices for advertisement spaces that are positioned lower. Then the advertiser submitting the highest bid may be assigned the winner for the highest worth advertisement space, the advertiser submitting the second highest bid may be assigned the winner for the second highest worth advertisement space, and so on until all of the available advertisement spaces are assigned a winning advertiser. In terms of prices paid by the winning advertisers for their advertisement spaces, the highest bid advertiser may pay the second highest submitted bid amount for the highest worth advertisement space, the second highest bid advertiser may pay the third highest submitted bid amount for the second highest worth advertisement space, and so on. This shifting of actual prices paid by the winning advertisers helps facilitate an auction between the publishers and advertisers where the bid prices generated for the available advertisement spaces more accurately estimate a worth of the advertisement spaces to the bidders.

GSP-based auction platforms have been used to price and select homogenous advertisement spaces (e.g., same advertisement space size, number of content lines, types of media content available for insertion, and/or other characteristics) through auctions with advertisers. However, recent advancement in Internet technologies have expanded the attributes and features of the advertisement space formats that are available for inclusion on a web page. This allows for each advertisement space displayed on a web page to be modified and updated to include a variety of sizes, number of content lines, decorations, and other distinguishing features that make them different from other advertisement spaces. With the advertisement spaces that are generated on web pages no longer being uniform, this has made it more difficult for GSP-based auction platforms to provide an auction experience where the bid prices for available advertisement space reflects an accurate worth for advertisers.

The search advertising auction tool (SAA tool) described herein redesigns an online advertisement auction system from the ground up in this new context, implementing a mechanism that optimizes an entire slate of non-conforming advertisements globally and computes prices for such non-conforming advertisements that achieve truthfulness properties (e.g., generate an estimated bid price that accurately represents a worth of available advertisement space to a bidder) analogous to those held by GSP-based auction platforms that offered simpler uniform advertisements. A careful algorithmic coupling of allocation-optimization and pricing-computation allows the search advertising auction tool to run an online auction to operate within the strict timing constraints inherent in real-time online advertisement auctions while also offering a more accurate online auction experience representing estimated worth of available advertisement spaces and bid pricing for both publishers and advertisers of non-conforming advertisements.

Existing web advertisement auction services may be limited to advertisement spaces having a predetermined allotment of content lines (e.g., 12 lines of advertisement data) at the top of a web page for advertisements. In this example of homogenous advertisement spaces, each individual advertisement space may be limited to three lines of information, resulting in four available advertisement slots.

Figure 5:
FIG. 5 illustrates an exemplary web page.

However, in the SAA tool disclosed herein, there may be advertisements that have the basic three lines plus additional lines of sitelinks (taking the user directly to special sections of the advertiser's landing page), star ratings, location information, a phone number, or other supplemental information or features that make up the unique advertisement spaces. An exemplary web page that accepts the new advertisements that are not limited to preset dimensions is illustrated by web page 500 shown in FIG. 5. Based on the search query, "flights to new york," input to the search engine 510 on web page 500, the web page 500 generated an advertisement space near the top of the web page 500 that accepted five unique advertisements 501-505 into a total of thirty four content lines. In the first advertisement 501, an advertisement for Virgin Airlines includes nine content lines. In the second advertisement 502, an advertisement for Expedia includes seven content lines (including a ratings line). In the third advertisement 503, an advertisement for Travelzoo includes seven content lines (including a ratings line). In the fourth advertisement 504, an advertisement for CheapOair includes six content lines. And in a fifth advertisement 505, an advertisement for Delta includes five content lines. As shown by web page 500, not all of the advertisements 501-505 include the same number of content lines.

Figure 6:
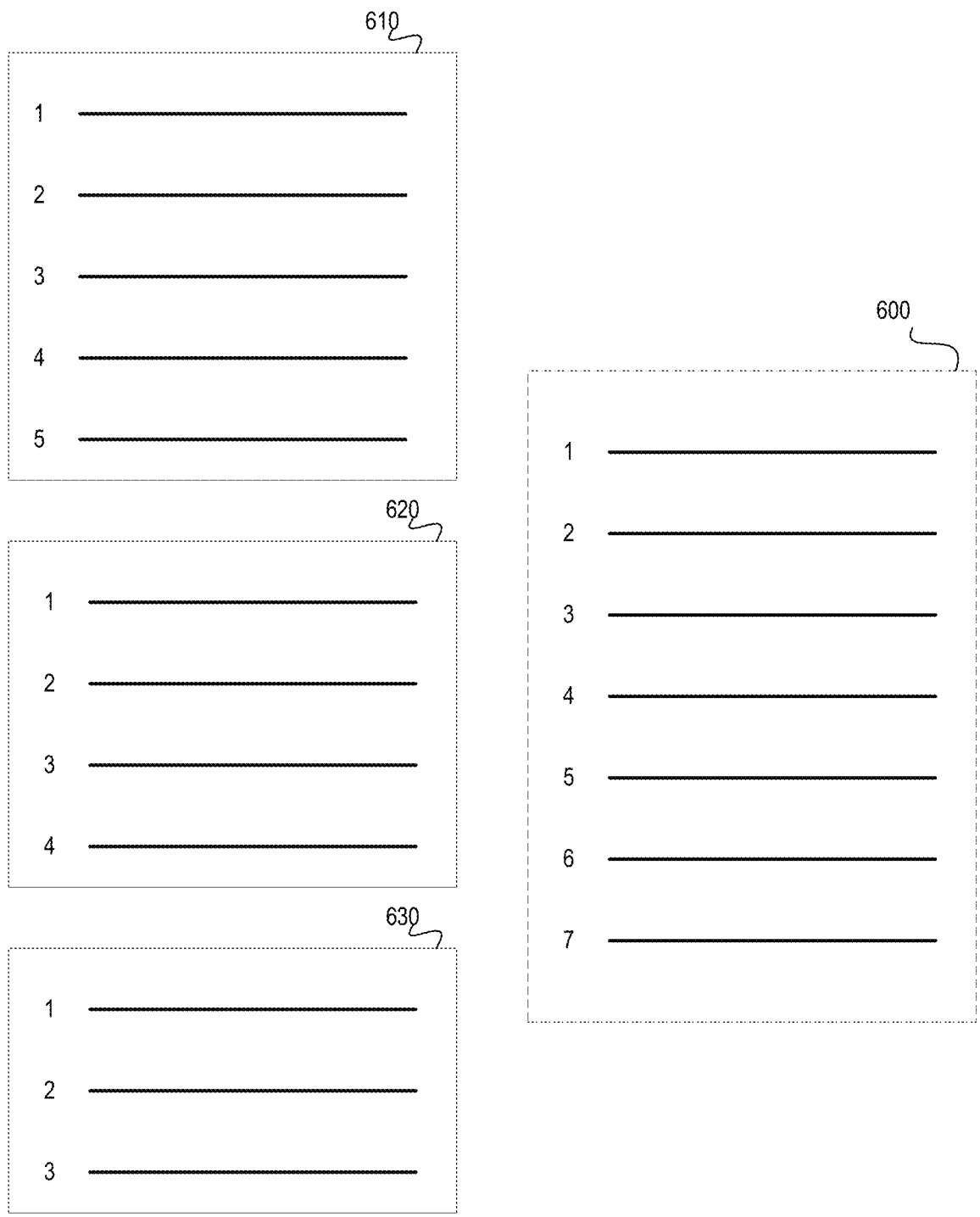
FIG. 6 illustrates an exemplary advertisement space

Conceptually, FIG. 6 shows a generic advertisement space 600 providing for seven total lines of advertisement data. FIG. 6 also shows three candidate advertisements: a first advertisement 610 includes five content lines, a second advertisement 620 includes four content lines, and a third advertisement includes three content lines. The first advertisement 610, the second advertisement 620, and the third advertisement 630 cannot all fit into the advertisement space 600. Therefore, an ad server for the respective web page will determine which advertisements will be selected. This is known as an ad packing problem.

According to a greedy algorithm that ranks advertisements based on their size (e.g., number of content lines), the first advertisement 610 may win selection for placement into the advertisement space 600. However, this may not be an efficient selection of advertisements for advertisement space 600 as there is no room for any of the remaining advertisements. So a more efficient solution offered by the SAA tool may overlook the largest advertisement and rather select two smaller advertisements such as the second advertisement 620 and the third advertisement 630 for inclusion into the advertisement space 600. This way, two advertisements may be displayed instead of just the one. Alternatively, the search advertising auction tool may determine a more efficient solution would be to trim the first advertisement (e.g., by one or more lines) to allow the first advertisement 610 to additionally be included with one of the second advertisement 620 or the third advertisement 630.

Such efficient solutions provided by the search advertising auction tool is made possible by the implementation of local-search based techniques that iteratively searches through different possible advertisement configurations for the given advertisement space. To evaluate the different advertisement configurations, the SAA tool utilizes a separable click-probability model wherein it is assumed that the probability that a given ad will be clicked is equal to the product of an ad-variant-specific ad clickability number and an ad-variant-independent location clickability number. Due to the consideration of the non-conforming advertisements that are not restricted to a predetermined number of content lines, the location clickability number can no longer be associated with an advertisement slot. Since the starting-position of the ith advertisement now depends on what kind of advertisement variants are known in terms of advertisement sizes, the location clickability is now a function of starting-line-position rather than slot-number within the advertisement space.

Noting that the most salient pricing schemes can all be described in terms of an allocation function $x_i$ (where $x_i(b_i)$ is the probability of bidder i receiving an ad click, given that he bids $b_i$), during the local search phase of the algorithm the SAA tool "logs" key information from which the SAA tool can, very quickly, compute each bidder's allocation function. Then, whatever pricing scheme is chosen, it can be applied by reading off prices from the computed allocation functions.

The advertisement allocation solution provided by the SAA tool first looks at identifying candidate advertisements for an available advertisement space on a given web page. For a set A of advertisement candidates, each unique advertisement a within the set A ($a \in A$) has a height $h(a)$ and is associated with an advertiser $\alpha(a) \in A$, where A is the set of all advertisers. At most one advertisement per advertiser is assumed to appear on the web page. There may also be configurable limits on the number and cumulative height of ads that can be shown on a single web page. For example, no more than an advertisement limit (ADLIM) number of advertisements may occupy a total of H lines may be selected as a limit. Each advertisement a has an associated bid $b(a)$ and vector of click probabilities $p(a, i)$. The associated bid $b(a)$ may be interpreted as a's claim about how much value he will receive should his advertisement be clicked. The vector of click probabilities $p(a, i)$ is the SAA tool's estimate of the probability with which the advertisement a will be clicked if it is placed at starting line $i \in \{0, \ldots, H-h(a)\}$. Each advertisement also has an associated vector of costs, which is representative of the externality the advertisement imposes (on the user, the search platform, or other involved party) if the advertisement is shown; $c(a, i)$ denotes this cost when advertisement a is placed at starting line $i \in \{0, \ldots, H-h(a)\}$. For each advertisement $a \in A$ and line $j=0, \ldots, H-1$, let $L_{aj}=\{i:j-h(a)+1 \leq i \leq j\}$, i.e., if advertisement a starts on line $i \in L_{aj}$ then the ad a covers line j.

The SAA tool may be operated to maximize efficiency, where efficiency may be a representation of total advertiser value net of costs imposed by the chosen configuration of advertisements that are selected for inclusion in the available advertisement space. Letting $x_{a,i}$ be a boolean variable denoting whether or not advertisement a is placed at starting line i, the described allocation problem may be formulated as follows:

$$\text{maximize} \sum_{i=0}^{H-1} \sum_{a \in A} (b(a)p(a, i) - c(a, i)) \cdot x_{a,i} \quad (1)$$

$$\text{subject to} \sum_{i=0}^{H-1} \sum_{a:\alpha(a)=\alpha} x_{a,i} \leq 1, \forall \alpha \in A, \quad (2)$$

$$\sum_{a \in A} \sum_{i \in L_{aj}} x_{a,i} \leq 1, \forall j = 0, \ldots, H-1, \quad (3)$$

$$\sum_{i=0}^{H-1} \sum_{a \in A} x_{a,i} \leq ADLIM, \quad (4)$$

$$x_{a,i} \in \{0, 1\}. \quad (5)$$

Constraint (2) indicates that the SAA tool may choose at most one advertisement variant per advertiser. Constraint (3) indicates that each line in the available advertisement space can be covered by at most one advertisement. This constraint also implicitly encodes the fact that the SAA tool's solution can use at most H lines. Constraint (4) limits the total number of advertisements chosen by the solution. The above is an integer program that can be solved with standard methods. Even though the problem is strongly NP-hard (by the reduction from 3-PARTITION), the number of possible advertisement candidates is bounded, and so asymptotic runtime analysis will not be relevant. However, the runtime constraints of this environment are extremely severe, to create an experience of instant service for search users, every millisecond counts, and there may not always be time to solve this integer program. Therefore, the SAA tool utilizes the local-search based heuristic approach to limit runtime constraints that may adversely cause longer processing times.

The local-search based heuristic approach utilized by the SAA tool to implement advertisement allocation includes the following two phases for advertisement slate cardinality $K \in \{1, \ldots, ADLIM\}$:

1. A greedy starting allocation—
   (a) Order A by bid times click-probability density.
   (b) Select the first K ad candidates in the ordered list, iteratively trimming the set of available candidates to respect constraint (2).
2. A local search loop of 1-for-1 ad swaps—
   Observe objective value X.
   For each a in the current solution (from top to bottom):
      (a) Remove a from the slate.
      (b) For each ad b in the set of ads that are not part of the current solution (including ad a), for each slot that b can feasibly be inserted into:[1]
         Insert b and observe the objective value.
         If it exceeds X, log the swap and go to (2.).
      (c) No swap for a improved the objective, so return a back to its original position.

Execution for the cardinality K iteration completes when there exists no 1-for-1 advertisement swap that improves the objective function. The best of the K locally optimal solutions is then chosen by the SAA tool for the available advertisement space.

So in the first phase, a rank-based configuration is initially generated that includes a default configuration of advertisement selected for inclusion into the available advertisement space based on the greedy algorithm. Then in phase two, the initial rank-based configuration is iteratively improved by the SAA tool by comparing it to different advertisement configurations until the local optimum is determined. This way, the SAA tool repeatedly considers small (i.e., local) changes to the configuration of advertisement variants until the SAA tool cannot improve on the most recent slate of advertisement configurations. The swaps considered by the SAA tool during phase two may include, for example, moving an advertisement variant to a different position in the order of advertisements within the available advertisement space, removing an advertisement variant and replacing it with a different advertisement variant, removing an advertisement variant and placing a different advertisement variant in a different place in the order of advertisements within the available advertisement space.

The SAA tool maximizes price estimation flexibility by estimating each bidder's (e.g., advertiser's) allocation curve $x_i$. The SAA tool generates the allocation curve $x_i$ for use in at least two implementations. First, as the SAA tool strives to maintain generalize second price (GSP)-like pricing, full knowledge of the allocation curve $x_i$ helps the SAA tool achieve this goal. Second, having access to allocation curve $x_i$ gives substantial flexibility in pricing if the SAA tool later wishes to change in the future.

The SAA tool may calculate an estimation for allocation curves attributed to a give bidder (i.e., advertiser) $\hat{x}_i(b_i)$ after the local search iterations according to the following:

1. For each bidder i, compute $\hat{\phi}_i$:
   (a) For each stored C, compute $z_{i,C} = \Sigma_{j \neq i} x_j(C) b_j$,
   (b) Compute $\hat{\phi}_i$ as the upper envelope of the lines:

$\{z_{i,C} + x_i(C) b_i\}$

This gives piecewise linear function $\hat{\phi}_i$ composed of lines (in order)

$(z_i[0], \hat{x}_i[0]), (z_i[1], \hat{x}_i[1]), \ldots, (z_i[k], \hat{x}_i[k])$ with inflection points $\tau_i[0]=0, \tau_i[1], \ldots, \tau_i[k]$.

2. Read off the (stepped) allocation curves as the derivative of the upper envelope:

$$\hat{x}_i(b_i) = \begin{cases} \hat{x}_i[j] & \tau_i[j] \leq b_i < \tau_i[j+1] \\ \hat{x}_i[k] & b_i \geq \tau_i[k] \end{cases}$$

After generating the estimated allocation curves $\hat{x}_i(b_i)$ for a bidder, the SAA tool may further generate an estimated price for an advertisement slate in the available advertisement space to the bidder that represents a worth of the advertisement slate to the bidder. The SAA tool may generate the estimated price in at least one of two approaches.

According to a first approach, the SAA tool generates a return on investment (ROI)-constrained truthful price $p_i$ that represents the pricing that would induce a truthful reporting of the bidder's willingness to pay for an advertisement slate when the bidder is a traditional profit-maximizer with an additional ROI constraint of $\alpha$. Using $\hat{x}_i(b_i)$ for the bidder, these prices under the first approach may be computed by the following recursive formula: $p_i[0]=0$, and for all $j>0$, $$p_i[j] = \min\left(\tau_i[j], \frac{\hat{x}_i[j-1] p_i[j-1] + (\hat{x}_i[j] - \hat{x}_i[j-1])(\alpha+1)\tau_i[j]}{\hat{x}_i[j]}\right)$$

The formula under the first approach may be interpreted as the bidder being charged the GSP price as long as the resulting marginal cost-per-click does not exceed $(\alpha+1)\tau[j]$, as illustrated above.

According to a second approach, the SAA tool generates $\alpha$-hybrid truthful price $p_i$ that is a pricing that would be truthful for bidders with a utility of the form $u_i = v_i^{\alpha+1} - p_i^{\alpha+1}$. The second approach offers a more continuous hybridization. The prices under the second approach may be expressed by the following formula:

$$p_i[j] = \frac{1}{x_i[j]} \left( \sum_{j=1}^{i} (\tau_i[j] \hat{x}_i[j])^{\alpha+1} - (\tau_i[j] \hat{x}_i[j-1])^{\alpha+1} \right)^{\frac{1}{\alpha+1}}$$

At $\alpha=0$, both the first approach and the second approach correspond to traditional profit maximizers. However, as $\alpha \to \infty$, both models converge to value maximizers. The SAA tool may choose the second approach, which is a hybrid approach, to mimic GSP pricing while curtailing extremely high marginal prices.

FIG. 1 illustrates an exemplary system diagram of a network system 100 for implementing the SAA tool that solves the ad packing problem of selecting non-conforming advertisements for inclusion into advertisement spaces in a truthful manner. The network system 100 includes advertiser server 130 comprised of a processor 131, a memory 132, and a network interface 133 for accessing network 140. The advertiser server 130 may generate an advertiser's internet advertisement, where the internet advertisement includes a link to the advertiser's web page that is activated when a user clicks on the internet advertisement. The internet advertisements may be stored on an advertising content database 134 that is in communication with the advertiser server 130. The advertiser server 130 may further transmit internet advertisements to other devices within the network system 100 through the network interface 133 via network 140.

The network system 100 also includes a web server 120 that hosts one or more web pages corresponding to an advertisement publisher. The web server 120 may be comprised of a processor 121, a memory 122, a search engine 123, and a network interface 124 for accessing network 140. Web page content included on a web page hosted by the web server 120 may be stored on a web page content database 125 in communication with the web server 120. The search engine 123 may receive a user's search query and search for related web page content in web page content database 125. The web server 120 may select, from the web page content database 125, web page content for display on a hosted web page based on the search results determined by the search engine 123. The web server 120 may also receive internet advertisements from ad server 110 to include in a rendering of a hosted web page.

The network system 100 also includes a communication device 150 that may be comprised of a processor 151, a memory 152, and a network interface 153 for accessing network 140. The communication device 150 may be for example, a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. Further, the communication device 150 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The communication device 150 may also include or execute an application to communicate content, such as, for example, textual content, multimedia content, or the like. The communication device 150 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Figure 3:
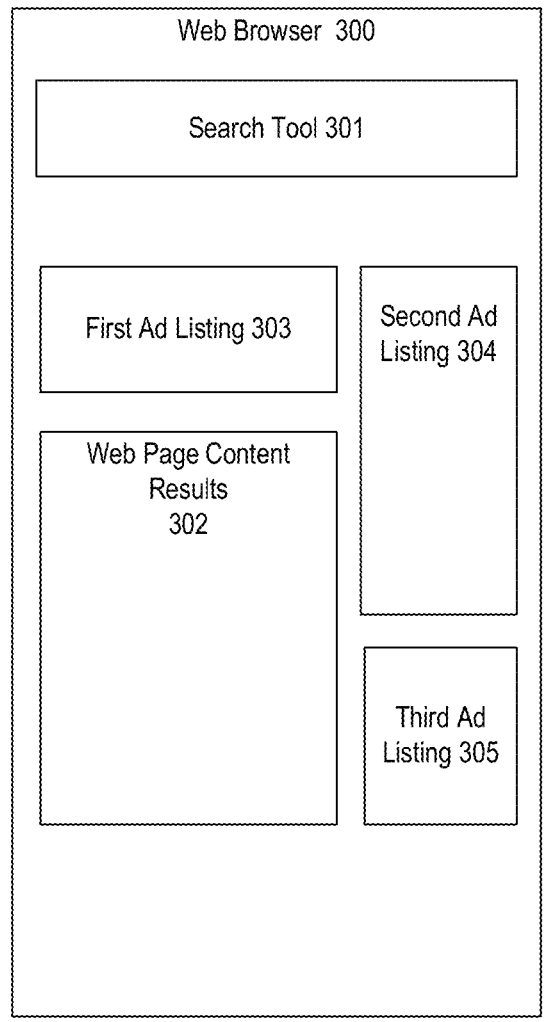
FIG. 3 illustrates an exemplary graphical user interface displaying a web page within a web browser application.

For example, communication device 150 may run a web browser application for accessing a web page hosted by web server 120, and rendering web page content corresponding to the hosted web page within the web browser application. FIG. 3 illustrates an exemplary web browser 300 running on, for example communication device 150, and rendering a web page hosted by, for example, web server 120. The web page rendered by web browser 300 includes a search tool 301, where the search tool 301 may correspond to search engine 123 included in web server 120. The web page further includes a first ad listing 303, a second ad listing 304, and a third ad listing 305. Each of the first ad listing 303, the second ad listing 304, and the third ad listing 305 may have been selected by, for example, an ad selector 114 (e.g., part of the SAA tool) of the ad server 110 based on search input and/or search results analyzed by search engine 123 included in web server 120. Each of the first ad listing 303, the second ad listing 304, and the third ad listing 305 may further have different attributes to achieve a heterogeneous mix of advertisements within the different ad spaces displayed on the web page.

The web page rendered by web browser 300 may further include web page content results 302, generated by, for example, search engine 123, based on a search query input by the user into the search tool 301. Further description for rendering and operating a web page within the network system 100 is provided throughout this disclosure.

The ad server 110, may include: a processor 111, a memory 112, a pricing generator 113, an ad selector 114, and a network interface 115 for accessing network 140. The ad server 110 may communicate with web server 120 to select an internet advertisement to display on a web page hosted by web server 120 based on information received from web server 120. In particular, ad server 110 may select internet advertisements to display on a web page hosted by web server 120 based on a user's search query input to search engine 123, communication device 150 attribute information, publisher identification information, and/or search query result information generated by search engine 123. The SAA tool may include portions of the pricing generator 113 and the ad selector 114, and run, at least in part, on the ad server 110. For instance, the SAA tool may include a set of instructions stored on the memory 112, and executed by the processor 111 of the ad server 110, to cause the ad server 110 to implement the attributed features of the SAA tool.

The pricing generator 113 may determine an estimated price for advertisements that are considered for inclusion into an advertisement space of a web page handled by the ad server 110 according to any one or more of the processes described herein. As described, the pricing generator 113 may determine the estimated price for each of the first ad listing 303, the second ad listing 304, and the third ad listing 305 based on dimensional information and/or other attributes of the respective advertisements and/or available advertisement space of the web page rendered by web browser 300. The dimensional information may include, for example, a number of content lines included in the respective advertisement. Other attributes may include search query information (e.g. a user's search query input to search engine 123), communication device information (e.g., information identifying a device type of communication device 150), and/or publisher identification information.

According to some embodiments, ad server 110 may be included as part of the web server 120, while in other embodiments ad server 110 may be a separate computing device as illustrated in FIG. 1. The ad server 110 may also be in communication with advertising content database 134 that stores internet advertisements. The internet advertisements stored on advertising content database 134 may have been received from advertiser server 130 through network interface 115 via the network 140.

The web page content and internet advertisements content described with reference to web server 120 and ad server 110 may be integrated together before being delivered to the web browser application running on the communication device 150.

Network 140 may include a wireless network configured to couple communication device 150 with other client devices coupled to the wireless network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, network 140 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within network 140, or the like.

Signal packets communicated via network 140, which may include a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of network 140, such as, for example, to one or more sites employing a local network address. A signal packet may, for example, be communicated over the Internet from a user site via an access node coupled to the Internet. Likewise, a signal packet may be forwarded via network nodes to a target site coupled to network 140 via a network access node, for example. A signal packet communicated via the Internet may, for example, be routed via a path of gateways, servers, etc. that may route the signal packet in accordance with a target address and availability of a network path to the target address.

Network 140 may also include a "content delivery network" or "content distribution network" (CDN), where the CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Network 140 may also include a peer-to-peer (or P2P) network, where the P2P network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

With respect to network 140, network 140 may couple devices so that communications may be exchanged, such as between web server 120 and communication device 150, or other devices within network system 100, including between wireless devices coupled via a wireless network, for example. Network 140 may also include mass storage, such as network attached storage (NAS), a storage area network (SAN), or other forms of computer or machine readable media, for example. Network 140 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within the larger network 140. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to network 140, such as via a telephone line or link, for example.

Figure 2:
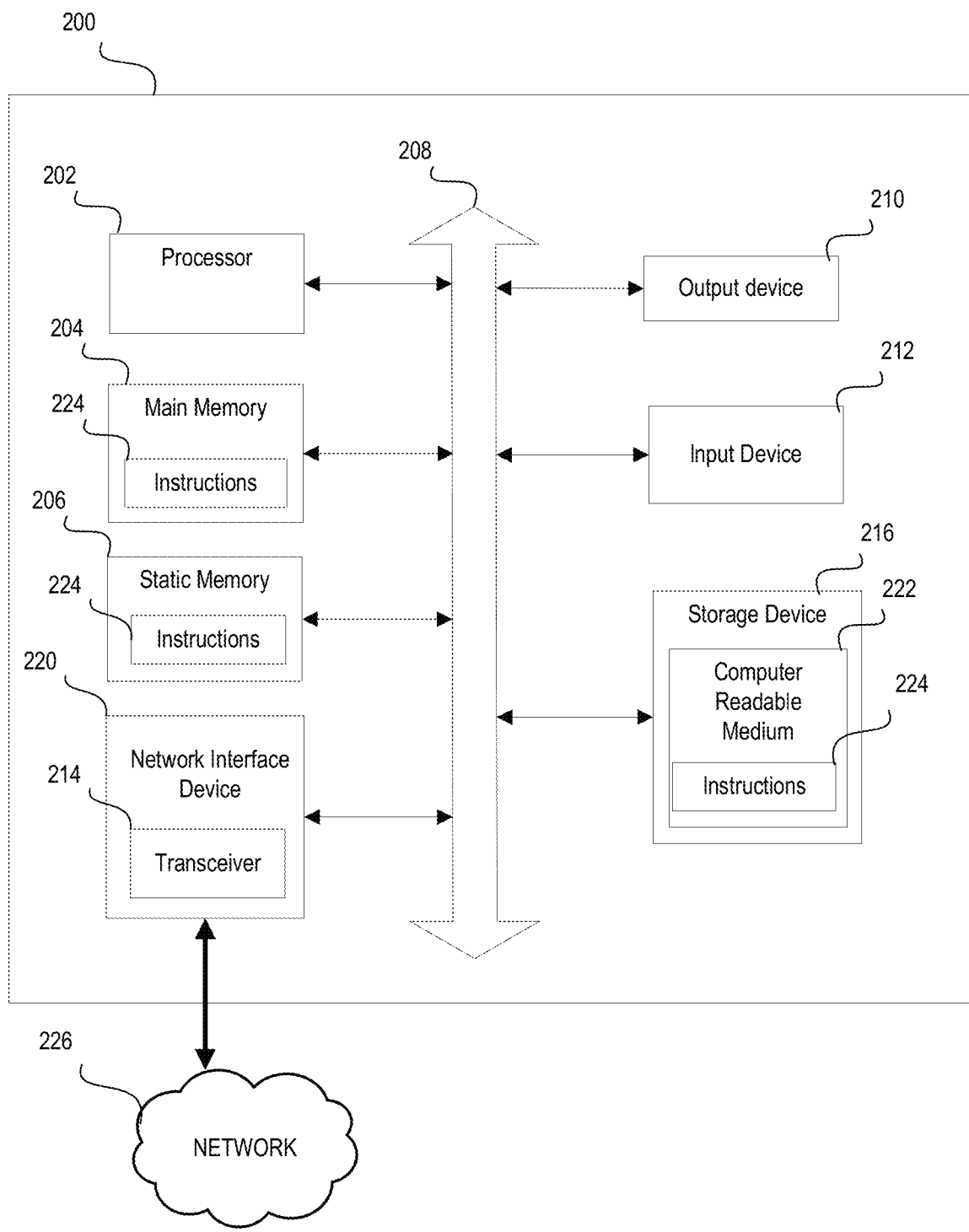
FIG. 2 illustrates a block diagram of exemplary computer architecture for one or more components included in the exemplary network illustrated in FIG. 1.

FIG. 2 illustrates exemplary computer architecture for a computer 200. Embodiments of the computer 200, including embodiments that include additional components and embodiments including fewer components than described, may be representative of any one or more of the devices that comprise network system 100 illustrated in FIG. 1.

The computer 200 includes a network interface device 220 that enables communication with other computers via a network 226, where network 226 may be represented by network 140 in FIG. 1. The computer 200 may include a processor 202, a main memory 204, a static memory 206, the network interface device 220, an output device 210 (e.g., a display or speaker), an input device 212, and a storage device 216, all connected via a bus 208.

The processor 202 represents a central processing unit of any type of architecture, such as a CISC (Complex Instruction Set Computing), RISC (Reduced Instruction Set Computing), VLIW (Very Long Instruction Word), or a hybrid architecture, although other appropriate processors may be used. The processor 202 executes instructions and includes portions of the computer 200 that control the operation of the entire computer 200. The processor 202 may also represent a controller that organizes data and program storage in memory and transfers data and other information between the various parts of the computer 200.

The processor 202 is configured to receive input data and/or user commands from the input device 212. The input device 212 may be a keyboard, mouse or other pointing device, trackball, scroll, button, touchpad, touch screen, keypad, microphone, speech recognition device, video recognition device, or any other appropriate mechanism for the user to input data to the computer 200 and control operation of the computer 200 and/or operation of the process steps and other features described herein. Although only one input device 212 is shown, in another embodiment any number and type of input devices may be included. For example, input device 212 may include an accelerometer, a gyroscope, and a global positioning system (GPS) transceiver.

The processor 202 may also communicate with other computers via the network 226 to receive instructions 224, where the processor may control the storage of such instructions 224 into any one or more of the main memory 204, such as random access memory (RAM), static memory 206, such as read only memory (ROM), and the storage device 216. The processor 202 may then read and execute the instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that make up the SAA tool, including portions of the pricing generator 113 and ad selector 114, or other components described herein.

Although computer 200 is shown to contain only a single processor 202 and a single bus 208, the disclosed embodiment applies equally to computers that may have multiple processors and to computers that may have multiple busses with some or all performing different functions in different ways.

The storage device 216 represents one or more mechanisms for storing data. For example, the storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although the computer 200 is drawn to contain the storage device 216, it may be distributed across other computers, for example on a server.

The storage device 216 may include a controller (not shown) and a computer readable medium 222 having instructions 224 capable of being executed by the processor 202 to carry out processes described herein. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 216 may also contain additional software and data (not shown), which is not necessary to understand the features described herein.

Output device 210 is configured to present information to the user. For example, the output device 210 may be a display such as a liquid crystal display (LCD), a gas or plasma-based flat-panel display, or a traditional cathode-ray tube (CRT) display or other well-known type of display in the art of computer hardware. Accordingly, in some embodiments the output device 210 displays a user interface. In other embodiments, the output device 210 may be a speaker configured to output audible information to the user. In still other embodiments, any combination of output devices may be represented by the output device 210.

Network interface device 220 provides the computer 200 with connectivity to the network 226 through any suitable communications protocol. The network interface device 220 sends and/or receives data from the network 226 via a wireless or wired transceiver 214. The transceiver 214 may be a cellular frequency, radio frequency (RF), infrared (IR) or any of a number of known wireless or wired transmission systems capable of communicating with the network 226 or other computer device having some or all of the features of computer 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller).

The computer 200 may be implemented using any suitable hardware and/or software, such as a personal computer or other electronic computing device. In addition to the various types of wearable devices described herein, the computer 200 may also be a smartphone, portable computer, laptop, tablet or notebook computer, PDA, pocket computer, appliance, telephone, or mainframe computer.

Figure 4:
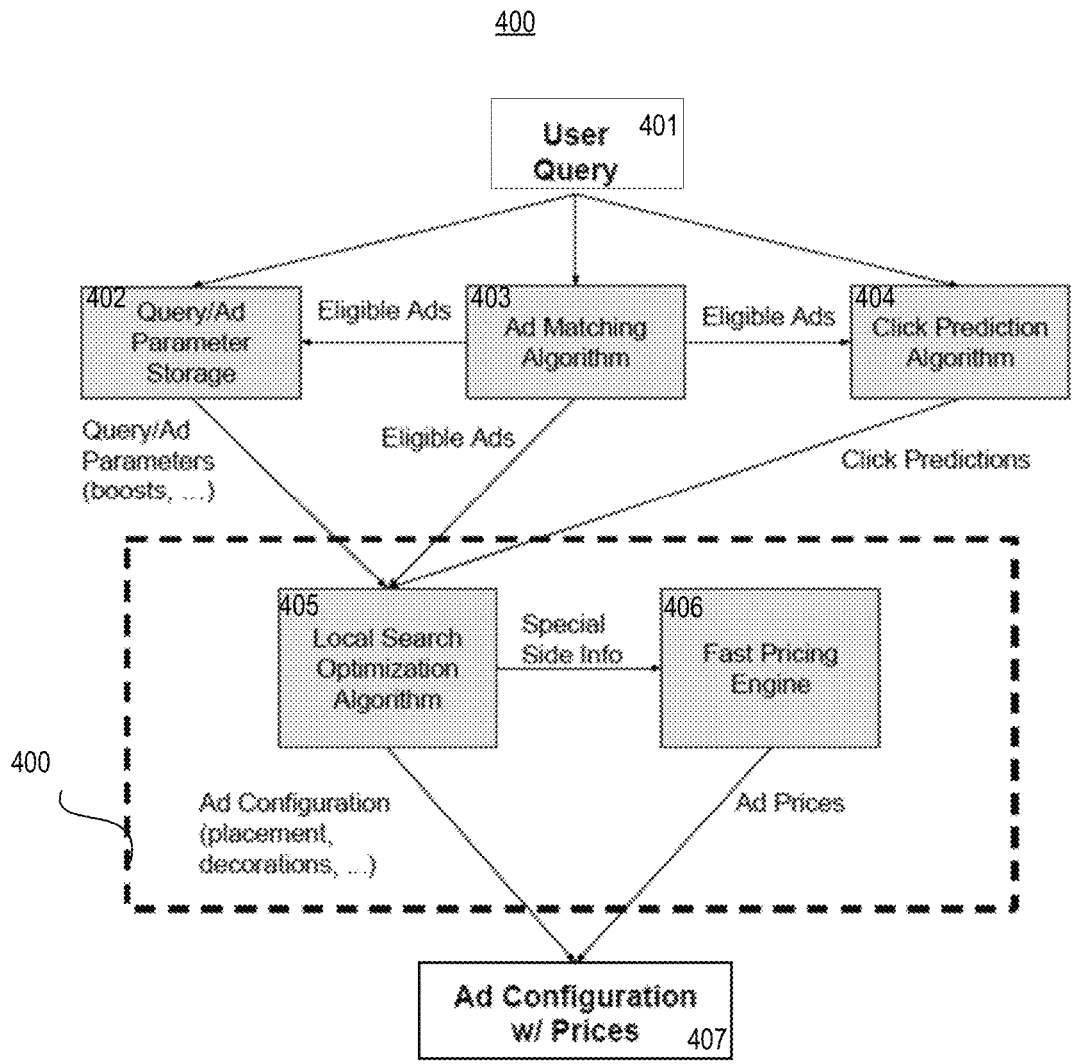
FIG. 4 illustrates an exemplary flow chart describing a process for running a search advertising auction.

FIG. 4 is a flow diagram 400 of logic describing processes implemented on the system 100 for running the SAA tool.

A user's search query may be entered into a search engine provided on a web page, where the search engine may be part of the SAA tool (401). For example, the search query "flights to new york" may be input to the search engine 510 provided by web page 500 illustrated in FIG. 5. The search engine 510 may receive the search query and recognize one or more keywords such as, for example, "new york" and "flights" that are of interest.

The keywords may be submitted to a query/ad parameter storage (402), an ad matching algorithm (403), and a click prediction algorithm (404). The query/ad parameter storage stores a collection of available advertisements and may be representative of, for example, the advertising content database 134.

The ad matching algorithm may be representative of, for example, operational logic implemented by the ad selector 114. According to the ad matching algorithm, the ad selector 114 may receive the keyword data from the search engine and select a set of candidate advertisements that share some relation to the keyword data. For example, the ad matching algorithm may cause the ad selector 114 to communicate with the query/ad parameter storage to parse advertisement stored in the query/ad parameter storage, and select one or more, or all, advertisements that are associated with one or more of the keywords identified in the keyword data. The advertisements selected from the query/ad parameter storage may be considered to be the set of eligible ads. The ad matching algorithm may also follow the greedy algorithm to select the set of eligible ads.

The click prediction algorithm may be representative of, for example, operational logic implemented by the SAA tool to generate click predictions for one or more, or all, of the eligible ads.

The local search optimization algorithm may then receive the set of eligible ads, parameter information for the eligible ads, and the click predictions (405). The local search optimization algorithm may be representative of, for example, operational logic implemented by the SAA tool to iterative analyze different configuration of the eligible ads according to the local-search techniques described herein. The local search optimization algorithm may iteratively consider different configuration of advertisements for inclusion into a given available advertisement space. The special side information includes objective values of each advertisement slate as a function of associated bids. The special side information is a linear function of the associated bids, so that the coefficients for each bid, as well as the intercept, for the linear function is stored as the special side information.

The fast pricing engine may receive the special side information generated by the local search optimization algorithm and generate price estimates according to the techniques described herein (406). This way, the fast pricing engine may generate estimated prices for each advertisement considered for inclusion into the advertisement configurations generated by the local search optimization algorithm.

After finalizing the local-search techniques to determine an optimized configuration of advertisements for an available advertisement space, estimated advertisement prices may be assigned to each of the advertisements included in the optimized configuration (407).

The disclosed method and system may be implemented partly in a server, a personal communication device, a cloud computing environment, partially in a server and partially in a client device, or a combination of the server, the cloud computing environment and the client device. It is therefore intended that the foregoing detailed description be regarded as illustrative rather than limiting, and that it be understood that it is the following claims, including all equivalents, that are intended to define the spirit and scope of this disclosure.

What is claimed is:

1. A system for considering online data for inclusion into a dedicated space, the system comprising:
a search engine configured to receive a search query;
a database configured to store available online data;
a network interface configured to communicate with the database; and
a processor configured to:
receive, through the network interface, the search query;
control the network interface to communicate with the database;
retrieve eligible online data from the database based upon the search query;
generate a click prediction based upon one or more attributes of the eligible online data;
generate a price estimate based upon the one or more attributes of the eligible online data;
analyze a plurality of configurations of the eligible online data for inclusion into the dedicated space, wherein analyzing comprises:
analyzing a first configuration, of the eligible online data, comprising a first advertisement of the eligible online data to determine a first efficiency associated with the first configuration based upon the click prediction and the price estimate; and
analyzing a second configuration, of the eligible online data, comprising a modified version of the first advertisement of the eligible online data and a second advertisement of the eligible online data to determine a second efficiency associated with the second configuration based upon the click prediction and the price estimate, wherein the modified version of the first advertisement is generated by trimming the first advertisement by one or more lines;
determine an optimum configuration of the eligible online data for inclusion into the dedicated space based upon the first efficiency and the second efficiency, wherein the dedicated space is an area displayed on a web page; and
provide the optimum configuration to a computer device.

2. The system of claim 1, wherein the first advertisement has a first number of lines and the modified version of the first advertisement has a second number of lines, wherein the second number of lines is less than the first number of lines.

3. The system of claim 1, wherein the first advertisement has a first line and a second line and the modified version of the first advertisement has the first line.

4. The system of claim 1, wherein the first efficiency is different than the second efficiency.

5. The system of claim 1, wherein the dedicated space is limited to a predetermined size.

6. The system of claim 5, wherein the predetermined size is provided in a number of web page content lines.

7. The system of claim 1, wherein the processor is configured to determine the optimum configuration of the eligible online data to maximize efficiency.

8. The system of claim 1, wherein the processor is configured to analyze the plurality of configurations of the eligible online data by combining different sized online data from the eligible online data into the dedicated space.

9. The system of claim 1, wherein the processor is configured to analyze the plurality of configurations of the eligible online data by modifying a size of online data from the eligible online data to fit into the dedicated space.

10. The system of claim 1, wherein the eligible online data includes online advertisements related to the search query.

11. A method for considering online data for inclusion into a dedicated space, the method comprising:
receiving, by a search engine, a search query provided on a web page;
communicating, through a network interface, with a database configured to store available online data;
retrieving, by a processor, eligible online data from the database based on the search query;
generating at least one of a click prediction or a price estimate based upon one or more attributes of the eligible online data;
analyzing, by the processor, a plurality of configurations of the eligible online data for inclusion into the dedicated space, wherein analyzing comprises:
analyzing a first configuration, of the eligible online data, comprising a first advertisement of the eligible online data to determine a first efficiency associated with the first configuration based upon at least one of the click prediction or the price estimate; and
analyzing a second configuration, of the eligible online data, comprising a modified version of the first advertisement of the eligible online data and a second advertisement of the eligible online data to determine a second efficiency associated with the second configuration based upon at least one of the click prediction or the price estimate;
determining, by the processor, an optimum configuration of the eligible online data for inclusion into the dedicated space based upon the first efficiency and the second efficiency, wherein the dedicated space is an area displayed on the web page; and
providing the optimum configuration to a computer device.

12. The method of claim 11, wherein:
generating comprises generating the click prediction based on the one or more attributes of the first eligible online data;
determining the first efficiency associated with the first configuration is based upon the click prediction; and
determining the second efficiency associated with the second configuration is based upon the click prediction.

13. The method of claim 11, wherein:
generating comprises generating the price estimate based upon the one or more attributes of the first eligible online data;
determining the first efficiency associated with the first configuration is based upon the price estimate; and
determining the second efficiency associated with the second configuration is based upon the price estimate.

14. The method of claim 11, wherein the modified version of the first advertisement is generated by trimming the first advertisement by one or more lines.

15. The method of claim 11, wherein the dedicated space is limited to a predetermined size.

16. The method of claim 15, wherein the predetermined size is provided in a number of web page content lines.

17. The method of claim 11, wherein determining the optimum configuration of the eligible online data comprises determining the optimum configuration of the eligible online data to maximize efficiency.

18. The method of claim 11, wherein analyzing the plurality of configurations of the eligible online data comprises combining different sized online data from the eligible online data into the dedicated space.

19. The method of claim 11, wherein analyzing the plurality of configurations of the eligible online data comprises modifying a size of online data from the eligible online data to fit into the dedicated space.

20. A non-transitory memory storing a set of processor executable instructions for, when executed by a processor, causes the processor to:
    receive, through a network interface, a search query input to a search engine included with a web page;
    control the network interface to communicate with a database storing available online data;
    retrieve eligible online data from the database based on the search query;
    generate a click prediction based upon one or more attributes of the eligible online data;
    generate a price estimate based upon the one or more attributes of the eligible online data;
    analyze a plurality of configurations of the eligible online data for inclusion into a dedicated space on the web page, wherein analyzing comprises:
        analyzing a first configuration, of the eligible online data, comprising a first advertisement of the eligible online data to determine a first efficiency associated with the first configuration based upon the click prediction and the price estimate; and
        analyzing a second configuration, of the eligible online data, comprising a modified version of the first advertisement of the eligible online data and a second advertisement of the eligible online data to determine a second efficiency associated with the second configuration based upon the click prediction and the price estimate; and
    determine an optimum configuration of the eligible online data for inclusion into the dedicated space based upon the first efficiency and the second efficiency, wherein the dedicated space is an area displayed on the web page.

* * * * *